(12) United States Patent
Mao et al.

(10) Patent No.: US 9,827,486 B2
(45) Date of Patent: Nov. 28, 2017

(54) ELECTRONIC DEVICE AND METHOD FOR PAUSING VIDEO DURING PLAYBACK

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Hai-Jun Mao, Shenzhen (CN); Chih-San Chiang, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 406 days.

(21) Appl. No.: 14/687,293

(22) Filed: Apr. 15, 2015

(65) Prior Publication Data
US 2016/0067598 A1    Mar. 10, 2016

(30) Foreign Application Priority Data

Sep. 5, 2014    (CN) .......................... 2014 1 0452163

(51) Int. Cl.
*A63F 9/24*       (2006.01)
*A63F 13/49*      (2014.01)
*H04N 21/47*      (2011.01)
*A63F 13/533*     (2014.01)
*H04N 21/433*     (2011.01)

(52) U.S. Cl.
CPC ................ *A63F 9/24* (2013.01); *A63F 13/49* (2014.09); *A63F 13/533* (2014.09); *H04N 21/4333* (2013.01); *H04N 21/47* (2013.01)

(58) Field of Classification Search
USPC ........................................................ 463/30, 31
See application file for complete search history.

(56) References Cited

U.S. PATENT DOCUMENTS

| 7,624,337 | B2 * | 11/2009 | Sull .................. G06F 17/30796 715/201 |
| 2015/0309686 | A1 * | 10/2015 | Morin ................... G06F 3/0485 715/720 |
| 2016/0247535 | A1 * | 8/2016 | Latulipe ............... G11B 27/002 |
| 2017/0201478 | A1 * | 7/2017 | Joyce ..................... H04L 51/10 |

FOREIGN PATENT DOCUMENTS

| TW | 201237801 A1 | 9/2012 |
| TW | 201419130 A | 5/2014 |

\* cited by examiner

*Primary Examiner* — Pierre E Elisca
(74) *Attorney, Agent, or Firm* — ScienBiziP, P.C.

(57) ABSTRACT

A method for pausing a video during playback in an electronic device includes detecting that a video playing interface within a first user interface is covered by a second user interface, upon such detection, calculating a coverage ratio of the second user interface to the video playing interface, and determining that the coverage ratio is greater than a predetermined value, upon such determination, pausing the playing of the video.

15 Claims, 3 Drawing Sheets

ELECTRONIC DEVICE AND METHOD FOR PAUSING VIDEO DURING PLAYBACK

CROSS-REFERENCE TO RELATED APPLICATIONS

This application claims priority to Chinese Patent Application No. 201410452163.3 filed on Sep. 5, 2014, the contents of which are incorporated by reference herein.

FIELD

The subject matter herein generally relates to video control technology applied to electronic devices, and particularly to an electronic device and a method for pausing a video during playback.

BACKGROUND

When an electronic device displays a video, the video needs to be paused manually.

BRIEF DESCRIPTION OF THE DRAWINGS

Implementations of the present disclosure will now be described, by way of example only, with reference to the attached figures.

DETAILED DESCRIPTION

Figure 1:
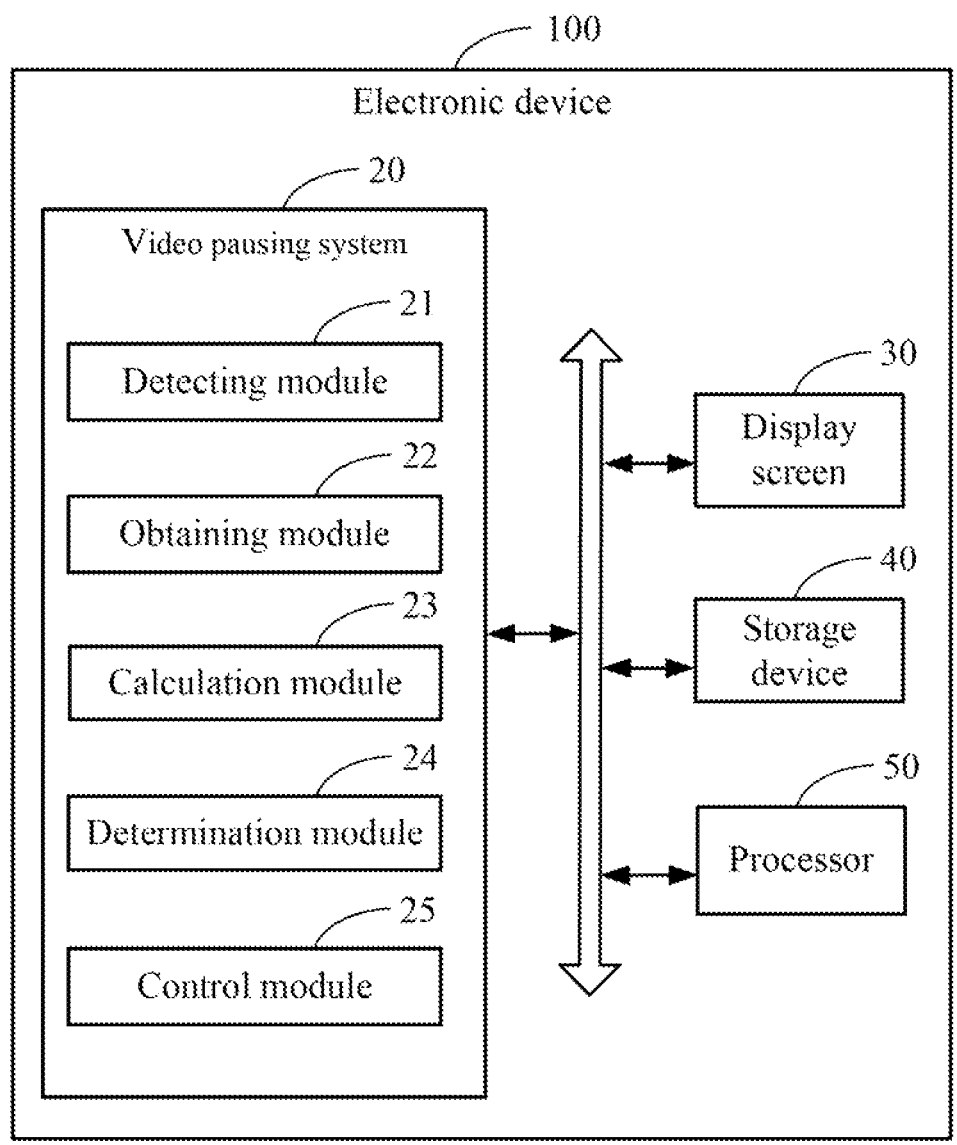
FIG. 1 is a block diagram of one example embodiment of an electronic device including a video pausing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts can be exaggerated to better illustrate details and features of the present disclosure.

Several definitions that apply throughout this disclosure will now be presented.

The term "comprising" means "including, but not necessarily limited to"; it specifically indicates open-ended inclusion or membership in a so-described combination, group, series and the like. The term "module" refers to logic embodied in hardware or firmware, or to a collection of software instructions, written in a programming language, such as, Java, C, or assembly. One or more software instructions in the modules can be embedded in firmware, such as in an erasable programmable read only memory (EPROM). The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of an example embodiment of an electronic device. In at least one embodiment as shown in FIG. 1, an electronic device 100 includes, but is not limited to, a video pausing system 20, a display screen 30, a storage device 40, and at least one processor 50. FIG. 1 illustrates only one example of the electronic device 100, other examples can comprise more or fewer components then shown in the embodiment, or have a different configuration of the various components.

In one embodiment, the electronic device 100 can be mobile phones, personal computer, tablet computer, or any other suitable electronic devices. The display screen 30 can display user interfaces.

The storage device 40 stores a predetermined value. The storage device 40 can be an internal storage device, such as a flash memory, a random access memory (RAM) for temporary storage of information, and/or a read-only memory (ROM) for permanent storage of information. The storage device 40 can also be an external storage device, such as an external hard disk, a storage card, or a data storage medium. The at least one processor 50 can be a central processing unit (CPU), a microprocessor, or other data processor chip that performs functions of the electronic device 100.

In one embodiment, when a video playing interface within a first user interface is covered by a second user interface and a coverage ratio of the second user interface to the video playing interface is greater than the predetermined value, the video pausing system 20 can pause the playing of a video automatically.

In at least one embodiment, the video pausing system 20 can include a detecting module 21, an obtaining module 22, a calculation module 23, a determination module 24, and a control module 25. Modules 21-25 can comprise computerized instructions in the form of one or more computer-readable programs that can be stored in a non-transitory computer-readable medium, for example in the storage device 40, and are executed by the at least one processor 50 of the electronic device 100 to provide functions of the present disclosure. A detailed description of the functions of the modules 21-25 is given below in reference to FIG. 1.

The detecting module 21 detects whether a video playing interface within a first user interface is covered by a second user interface when a video is played on the electronic device 100.

Figure 2:
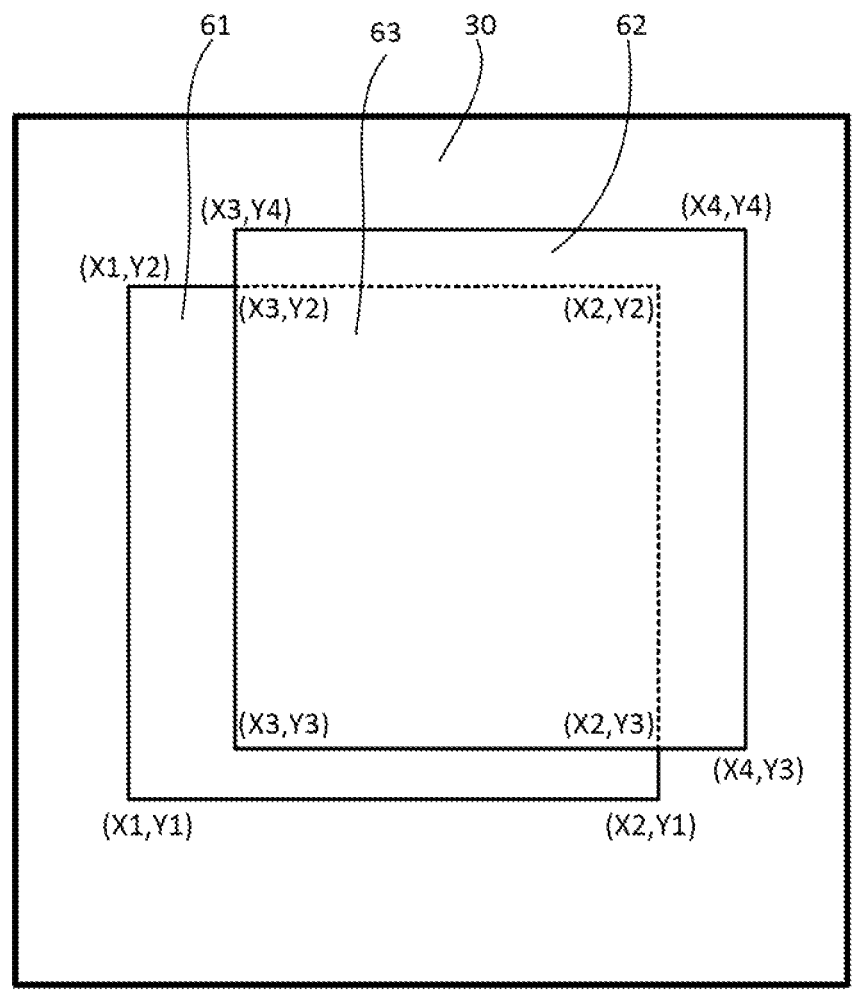
FIG. 2 is a diagrammatic view of one example embodiment of user interfaces of the electronic device of FIG. 1.

If the video playing interface 61 is covered by the second user interface 62, as shown in FIG. 2, the calculation module 23 calculates a coverage ratio of the second user interface 62 to the video playing interface 61.

In at least one embodiment, the determination module 24 determines a covered region of the video playing interface 61, and the calculation module 23 respectively calculates the size of the covered region and the whole video playing interface 61, and calculates a percentage of the size of the covered region relative to the size of the whole video playing interface 61. In at least one embodiment, the coverage ratio is equal to the percentage.

In at least one embodiment, the obtaining module 22 obtains coordinate values of each apex of the video playing interface 61, and obtains coordinate values of each apex of the second user interface 62 which covers the video playing interface 61. The determination module 24 determines an overlap region 63 between the video playing interface 61 and the second user interface 62, according to the obtained coordinate values of each apex of the video playing interface and the obtained coordinate values of each apex of the second user interface 62. In at least one embodiment, the covered region of the video playing interface 61 is equal to the overlap region 63.

The calculation module 23 calculates the size of the whole video playing interface according to the coordinate values of each apex of the video playing interface 61.

The calculation module 23 further determines the coordinate values of each apex of the covered region according to the coordinate values of each apex of the video playing interface and the coordinate values of each apex of the second user interface 62, and calculates the size of the covered region according to the coordinate values of each apex of the covered region.

The determination module 24 determines whether the coverage ratio is greater than the predetermined value which is stored in the storage device 40.

If the coverage ratio is greater than the predetermined value, the control module 25 pauses the playing of the video.

Figure 3:
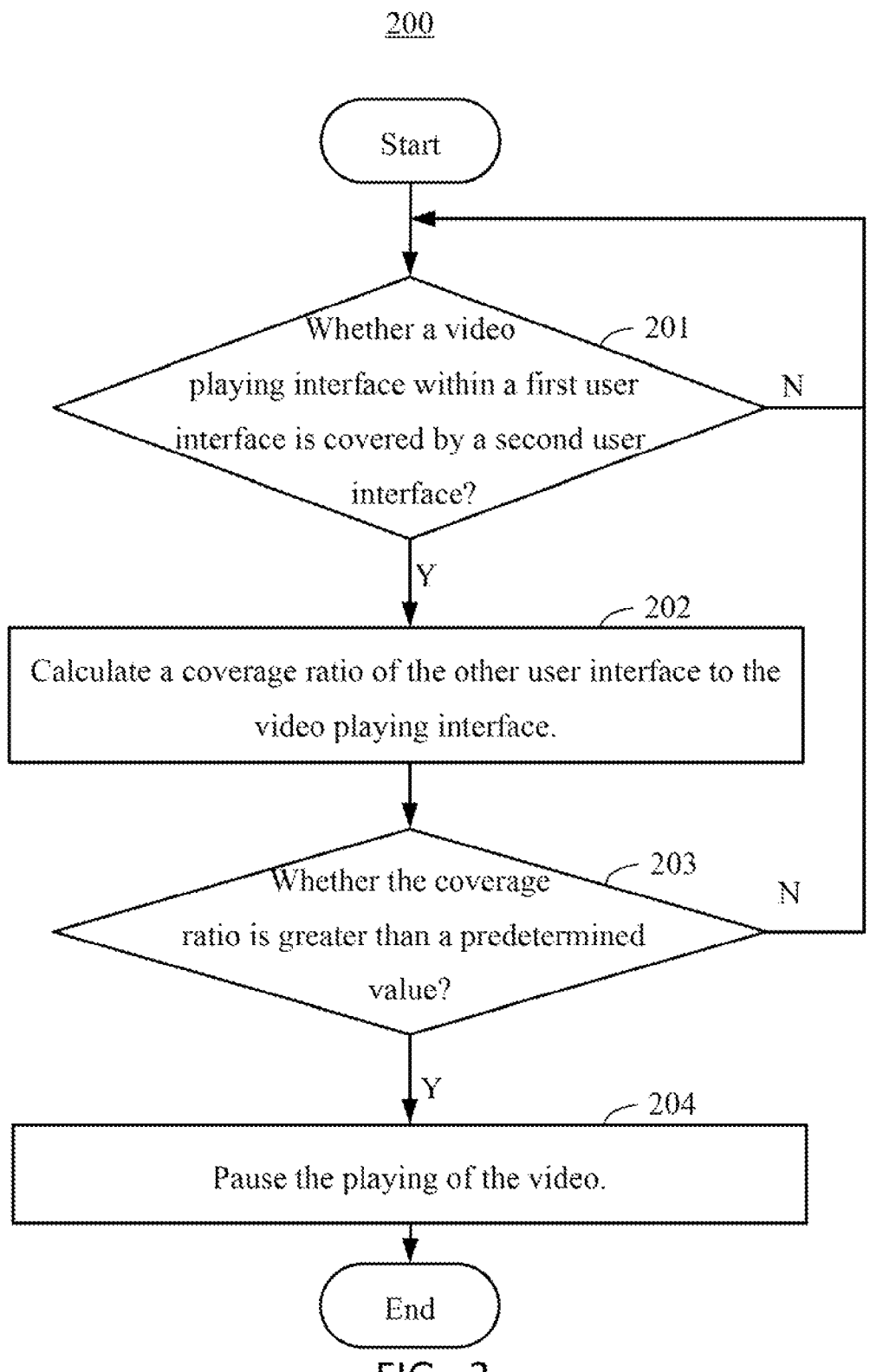
FIG. 3 is a flowchart of one example embodiment of a method for pausing a video during playback in the electronic device of FIG. 1.

FIG. 3 illustrates a flowchart of an example embodiment of a method for pausing a video during playback in an electronic device. In an example embodiment, the method 200 is performed by execution of computer-readable software program codes or instructions by at least one processor of the electronic device.

Referring to FIG. 3, the flowchart is presented in accordance with an example embodiment which is being thus illustrated. The example method 200 is provided by way of example, as there are a variety of ways to carry out the method. The method 200 described below can be carried out using the configurations illustrated in FIG. 1, for example, and various elements of these figures are referenced in explaining method 200. Each block shown in FIG. 3 represents one or more processes, methods, or subroutines, carried out in the exemplary method 200. Furthermore, the illustrated order of blocks is by example only and the order of the blocks can change according to the present disclosure. Additional blocks can be added or fewer blocks can be utilized, without departing from this disclosure. The example method 200 can begin at block 201.

At block 201, a detecting module detects whether a video playing interface within a first user interface is covered by a second user interface when a video is played on the electronic device. If the video playing interface is covered by a second user interface, block 202 is implemented. Otherwise, the process remains in block 201.

At block 202, a calculation module calculates a coverage ratio of the second user interface to the video playing interface.

In at least one embodiment, a determination module determines a covered region of the video playing interface, and the calculation module respectively calculates the size of the covered region and the whole video playing interface, and calculates a percentage of the size of the covered region relative to the size of the whole video playing interface. In at least one embodiment, the coverage ratio is equal to the percentage.

In at least one embodiment, an obtaining module obtains coordinate values of each apex of the video playing interface, and obtains coordinate values of each apex of the second user interface which covers the video playing interface. The determination module determines an overlap region between the video playing interface and the second user interface, according to the obtained coordinate values of each apex of the video playing interface and the obtained coordinate values of each apex of the second user interface.

In at least one embodiment, the covered region of the video playing interface is equal to the overlap region.

The calculation module calculates the size of the whole video playing interface according to the coordinate values of each apex of the video playing interface.

The calculation module further determines the coordinate values of each apex of the covered region according to the coordinate values of each apex of the video playing interface and the coordinate values of each apex of the second user interface, and calculates the size of the covered region according to the coordinate values of each apex of the covered region.

At block 203, the determination module determines whether the coverage ratio is greater than a predetermined value which is stored in a storage device of the electronic device. If the coverage ratio is greater than the predetermined value, block 204 is implemented. Otherwise, the process goes back to block 201.

At block 204, a control module pauses the playing of the video.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in particular the matters of shape, size, and arrangement of parts within the principles of the present disclosure, up to and including the full extent established by the broad general meaning of the terms used in the claims.

What is claimed is:

1. An electronic device comprising:
   a display screen configured to display user interfaces;
   at least one processor coupled to the display screen; and
   a storage device coupled to the processor, the storage device storing one or more programs, which upon execution by the at least one processor, cause the at least one processor to:
   detect that a video playing interface within a first user interface is covered by a second user interface when a video is playing on the electronic device;
   upon such detection, calculate a coverage ratio of the second user interface to the video playing interface;
   determine that the coverage ratio is greater than a predetermined value; and
   upon such determination, pause the playing of the video.

2. The electronic device as described in claim 1, wherein the at least one processor calculates the coverage ratio by:
   determining a covered region of the video playing interface;
   respectively calculating the size of the covered region and the whole video playing interface; and
   calculating a percentage of the size of the covered region relative to the size of the whole video playing interface, wherein the coverage ratio is equal to the percentage.

3. The electronic device as described in claim 2, wherein the at least one processor determines the covered region of the video playing interface by:
   obtaining coordinate values of each apex of the video playing interface, and obtaining coordinate values of each apex of the second user interface which covers the video playing interface; and
   determining an overlap region between the video playing interface and the second user interface, according to the obtained coordinate values of each apex of the video playing interface and the obtained coordinate values of each apex of the second user interface, wherein the covered region of the video playing interface is equal to the overlap region.

4. The electronic device as described in claim 3, wherein the at least one processor calculates the size of the whole video playing interface according to the coordinate values of each apex of the video playing interface.

5. The electronic device as described in claim 3, wherein the at least one processor determines the coordinate values of each apex of the covered region according to the coordinate values of each apex of the video playing interface and the coordinate values of each apex of the second user interface, and calculates the size of the covered region according to the coordinate values of each apex of the covered region.

6. A computer-implemented method for pausing a video during playback in an electronic device, the method comprising:
   detecting that a video playing interface within a first user interface is covered by a second user interface when a video is played on the electronic device;
   upon such detection, calculating a coverage ratio of the second user interface to the video playing interface;
   determining that the coverage ratio is greater than a predetermined value; and
   upon such determination, pausing the playing of the video.

7. The method as described in claim 6, wherein the coverage ratio is calculated by:
   determining a covered region of the video playing interface;
   respectively calculating the size of the covered region and the whole video playing interface; and
   calculating a percentage of the size of the covered region relative to the size of the whole video playing interface, wherein the coverage ratio is equal to the percentage.

8. The method as described in claim 7, wherein the covered region of the video playing interface is determined by:
   obtaining coordinate values of each apex of the video playing interface, and obtaining coordinate values of each apex of the second user interface which covers the video playing interface; and
   determining an overlap region between the video playing interface and the second user interface, according to the obtained coordinate values of each apex of the video playing interface and the obtained coordinate values of each apex of the second user interface, wherein the covered region of the video playing interface is equal to the overlap region.

9. The method as described in claim 8, wherein the size of the whole video playing interface is calculated according to the coordinate values of each apex of the video playing interface.

10. The method as described in claim 8, wherein the size of the covered region is calculated by:
    determining the coordinate values of each apex of the covered region according to the coordinate values of each apex of the video playing interface and the coordinate values of each apex of the second user interface; and
    calculating the size of the covered region according to the coordinate values of each apex of the covered region.

11. A non-transitory storage medium having stored thereon instructions that, when executed by at least one processor of an electronic device, causing the electronic device to perform a method for pausing a video during playback in the electronic device, the method comprising:
    detecting that a video playing interface within a first user interface is covered by a second user interface when a video is played on the electronic device;
    upon such detection, calculating a coverage ratio of the second user interface to the video playing interface;
    determining that the coverage ratio is greater than a predetermined value; and
    upon such determination, pausing the playing of the video.

12. The non-transitory storage medium as described in claim 11, wherein the coverage ratio is calculated by:
    determining a covered region of the video playing interface;
    respectively calculating the size of the covered region and the whole video playing interface; and
    calculating a percentage of the size of the covered region relative to the size of the whole video playing interface, wherein the coverage ratio is equal to the percentage.

13. The non-transitory storage medium as described in claim 12, wherein the covered region of the video playing interface is determined by:
    obtaining coordinate values of each apex of the video playing interface, and obtaining coordinate values of each apex of the second user interface which covers the video playing interface; and
    determining an overlap region between the video playing interface and the second user interface, according to the obtained coordinate values of each apex of the video playing interface and the obtained coordinate values of each apex of the second user interface, wherein the covered region of the video playing interface is equal to the overlap region.

14. The non-transitory storage medium as described in claim 13, wherein the size of the whole video playing interface is calculated according to the coordinate values of each apex of the video playing interface.

15. The non-transitory storage medium as described in claim 13, wherein the size of the covered region is calculated by:
    determining the coordinate values of each apex of the covered region according to the coordinate values of each apex of the video playing interface and the coordinate values of each apex of the second user interface; and
    calculating the size of the covered region according to the coordinate values of each apex of the covered region.

* * * * *